United States Patent [19]
Koumatsu

[11] Patent Number: 6,036,541
[45] Date of Patent: Mar. 14, 2000

[54] RUBBER PLUG WITH LIPS

[75] Inventor: Seiji Koumatsu, Shizuoka, Japan

[73] Assignee: Yazaki Corporation, Tokyo, Japan

[21] Appl. No.: 08/919,161

[22] Filed: Aug. 28, 1997

[30] Foreign Application Priority Data

Aug. 28, 1996 [JP] Japan .................................. 8-226960

[51] Int. Cl.[7] .................................................. H01R 13/40
[52] U.S. Cl. ........................ 439/587; 439/275; 277/612; 277/615; 215/355; 220/789
[58] Field of Search .................................. 439/587, 589, 439/274, 275, 279; 277/607, 612, 615; 215/355, 357; 220/DIG. 19, 789, 792, 784, 487

[56] References Cited

U.S. PATENT DOCUMENTS

| | | | |
|---|---|---|---|
| 5,562,494 | 10/1996 | Fujiwara | 439/275 |
| 5,611,706 | 3/1997 | Makita et al. | 439/275 |
| 5,626,489 | 5/1997 | Marshall et al. | 439/402 |
| 5,660,566 | 8/1997 | Ohsumi | 439/275 |
| 5,720,487 | 2/1998 | Kato | 439/274 |

Primary Examiner—Renee S. Luebke
Assistant Examiner—T C Patel
Attorney, Agent, or Firm—Morgan, Lewis & Bockius LLP

[57] ABSTRACT

A rubber plug includes a tubular body having a cross-sectionally corrugated inner surface including a plurality of conically shaped surfaces, and a plurality of lips formed integrally on and projecting radially outwardly from an outer surface of the tubular body in planes perpendicular to a longitudinal axis of the tubular body and including first, second and third lips, the plurality of lips being spaced along the longitudinal axis, wherein a distance between the first lip and the second lip in a direction of the longitudinal axis is different than a distance between the second and third lips in the direction of the longitudinal axis.

10 Claims, 7 Drawing Sheets

RUBBER PLUG WITH LIPS

BACKGROUND OF THE INVENTION

1. Field of the Invention

This invention relates to a rubber product with lips, and more particularly to a rubber product of the type which includes a tubular body having a cross-sectionally corrugated inner surface, and a plurality of lips which are formed integrally on and project radially outwardly from an outer surface of the body in respective planes perpendicular to a longitudinal axis of the body, and are spaced at intervals along the longitudinal axis.

2. Description of the Related Art

A conventional rubber product with lips will be described with reference to FIGS. 6 to 10. FIG. 6 is a vertical cross-sectional view showing a rubber plug 101 having generally the same construction as that of a rubber product of the present invention with lips. A tubular body 102 includes a radially outwardly-projecting end 107, and a cylindrical extension portion 109 extends from this end along a longitudinal axis, and three horizontally-extending, disk-shaped lips 103, 104 and 105 are formed on an outer peripheral surface of the body 102, and are spaced at equal intervals from one another in the direction of the axis (that is, a=b). A flat open end of the outermost lip 105 defines the other end 108, and these portions are molded into an integral construction, using three molds which can be separated from one another in an upward-downward direction, with the main mold disposed between the upper and lower molds.

An inner peripheral surface 106 of the body 102 has a bellows-like cylindrical surface having a corrugated cross-section along the longitudinal axis X, and grooves 113, 114 and 115 of this corrugation correspond respectively to the lips, and the lips are formed on the outer peripheral surface of the body in such a manner that each lip and the corresponding groove have their respective median planes disposed in a common plane perpendicular to the axis. Similarly, ridges 116, 117 and 118 of the corrugated cross-section correspond respectively to annular constricted portions 111 and 112 each spacing the adjacent lips from each other in the axial direction.

The above rubber product with the lips is produced by an injection molding method using a three-stack-type mold as shown in FIG. 7. The upper mold A has a pin D for molding the inner peripheral surface 106 of the rubber plug 101, and this pin D extends vertically through a mold cavity in the centrally-disposed main mold B, and is mated at its lower end with an upper flat surface of the lower mold C.

For removing the injection molded product from the stack-type mold comprising the three mold portions which can be separated from one another, the upper mold A is first withdrawn, and then the lower mold C is removed, and finally the molded product is upwardly pushed out of the central main mold B. Particularly, in the final product removal step, a jet of air is applied to the lower end of the product, or a pushing force is applied to this lower end by a projecting member such as a pin, in an upward direction as indicated by a void arrow in FIG. 8. By this pushing force, the molded product is pushed upward step by step in such a manner that because of their elastic deformation, the three radially outwardly-projecting, disk-shaped lips 103, 104 and 105 are disengaged from their respective mold cavities, and are sequentially engaged in the upwardly-disposed mold cavities.

In this case, the three horizontally-extending lips of the product are spaced at equal intervals along the axis X of the body, and therefore a considerable frictional resistance is involved when the lips are sequentially engaged in the upwardly-disposed mold cavities in a step-by-step manner. That portion of each lip, which produces the maximum frictional resistance during this process, is indicated by a point Z in FIGS. 8 and 10 (which are cross-sectional views) for the simplicity of the description although this portion is actually annular.

In the first push-out step in which the uppermost lip 103 is disengaged from the main mold B, six maximum frictional resistance points (6.Z) develop on the product 100 as shown in FIG. 8. Then, when the second lip 104 is to be disengaged from the main mold B, four maximum frictional resistance points (4.Z) develop as shown in FIG. 9. Then, when disengaging the remaining lip 105 from the main mold so as to completely remove the product from the mold, two maximum frictional resistance points (2.Z) develop as shown in FIG. 10.

In the push-out step shown in FIGS. 8 and 9, the plurality of lips are simultaneously elastically deformed to thereby produce the large frictional resistance, and then are engaged respectively in the upwardly-disposed mold cavities, and therefore the considerable pushing force is required, so that the production efficiency is lowered, and besides there is a possibility that the molded product is subjected to damage such as the formation of a crack in the proximal end of the lip connected to the body, and the separation of the lip from the body. Particularly, in view of the fact that this operation is effected immediately after the product is molded, that is, when the product is not yet completely cured, this is a problem which can not be ignored from the viewpoint of the production.

Therefore, in order to avoid such a problem, it is desired that the mold should be so designed that the force required for one push-out operation can be reduced, that is, the mold removal resistance can be reduced.

SUMMARY OF THE INVENTION

It is therefore an object of this invention to provide a rubber product with lips which can be smoothly and rapidly removed from a mold with a small pushing force without damage immediately after the molding of the rubber product, and is simple in construction, and has an excellent mold removal property.

The above object is achieved by a rubber product wherein the spacing distances between the adjacent lips in the axial direction are increased or decreased step by step from one end of a body toward the other end thereof, and the one end serves as a removal end projecting from a main mold after the molding of the rubber product.

With this construction, when pushing the rubber product out of the main mold immediately after the molding thereof, only one lip is always completely fitted in the corresponding mold cavity close to the above one end except when pushing out the lip close to this one end, so that a frictional resistance acts on one lip, and therefore the force, required for pushing out the rubber product, is constant and small, and besides a mold removal resistance, acting on the product, is kept to a minimum, and is dispersed uniformly.

In one aspect of the invention, the lips are formed integrally on the outer surface of the body in such a manner that they correspond respectively to grooves in a corrugated inner surface of the body. With this arrangement of the lips, the lips can be easily elastically deformed at their proximal ends when removing the product from the mold, so that the mold removal resistance is further reduced.

In another aspect of the invention, the one end has an extension portion of a cylindrical shape extending from the foremost lip in the direction of the longitudinal axis, and the other end is formed by the rearmost lip. With this construction, the rubber product can be easily mounted on an instrument, for example by fitting the rubber product into a hole in an panel, and besides a stress, acting on the foremost lip when extruding the rubber product, is reduced, thereby protecting the product from damage when removing the product from the mold.

In a further aspect of the invention, the body has not less than three lips. With this construction, the rubber product is used as an elastic rubber bushing serving as an ordinary small-size electric part.

In a further aspect of the invention, that portion of the corrugated inner surface, disposed at an opening of the other end, is defined by a groove which is open. By thus forming the interior of the other end into a space of a truncated-cone shape, the insertion of a cable or the like into the bore of the rubber product can be easily guided, and besides an enhanced sealing effect can be obtained.

DESCRIPTION OF THE PREFERRED EMBODIMENT OF THE INVENTION

One preferred embodiment of the present invention will now be described with reference to the accompanying drawings. The present invention is not limited to the embodiment described below, but various modifications can be made based on the technical concept of the invention.

Figure 1:
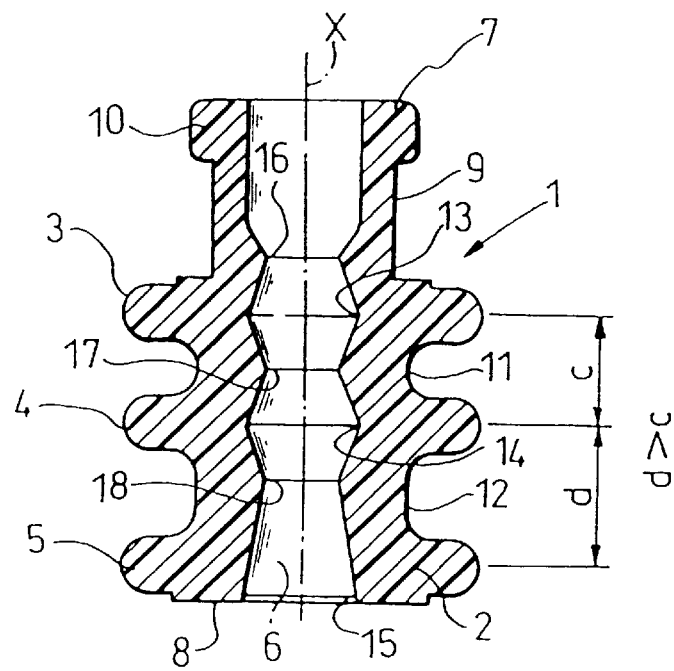
FIG. 1 is a vertical cross-sectional view of a rubber product with lips provided in accordance with the present invention.
Figure 2:
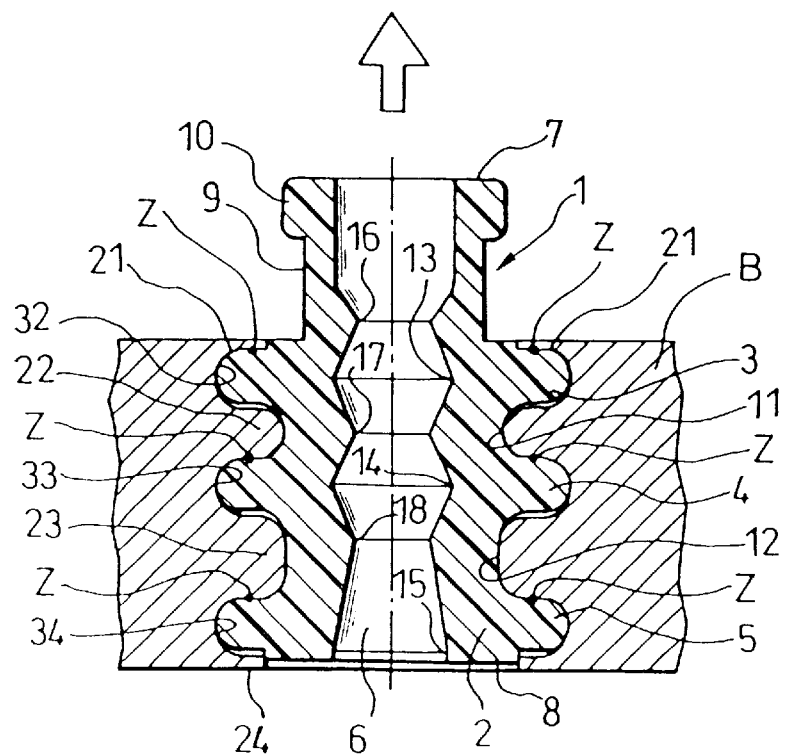
FIG. 2 is a vertical cross-sectional view showing a condition before the rubber product of FIG. 1 is removed from a main mold.
Figure 3:
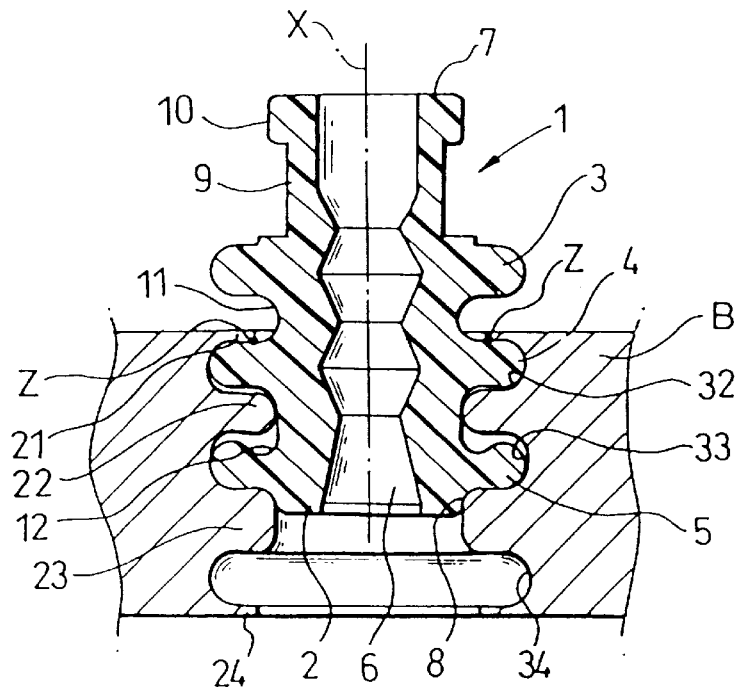
FIG. 3 is a vertical cross-sectional view showing a first step of a mold removal operation in which the rubber product of FIG. 2 is pushed out of the main mold in a direction of a void arrow.
Figure 4:
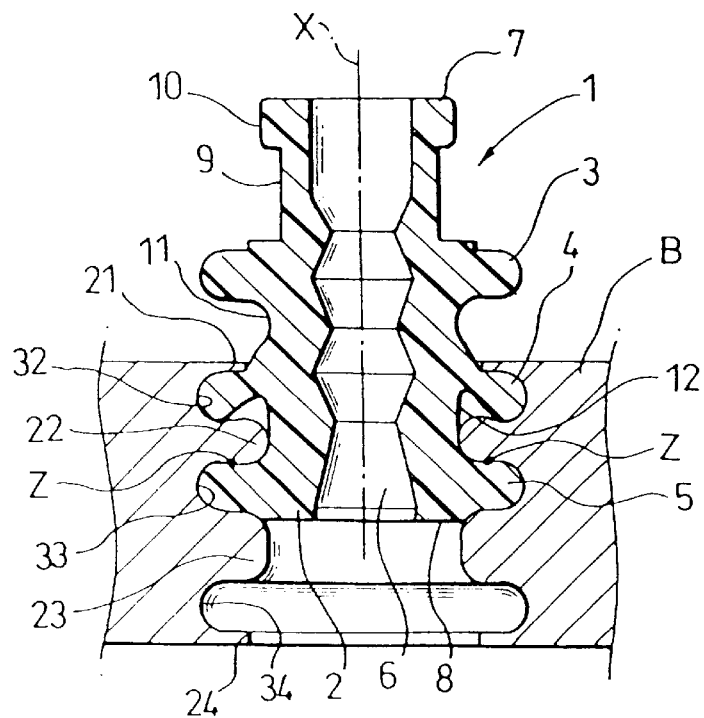
FIG. 4 is a vertical cross-sectional view similar to FIG. 3, but showing a second step of the mold removal operation.
Figure 5:
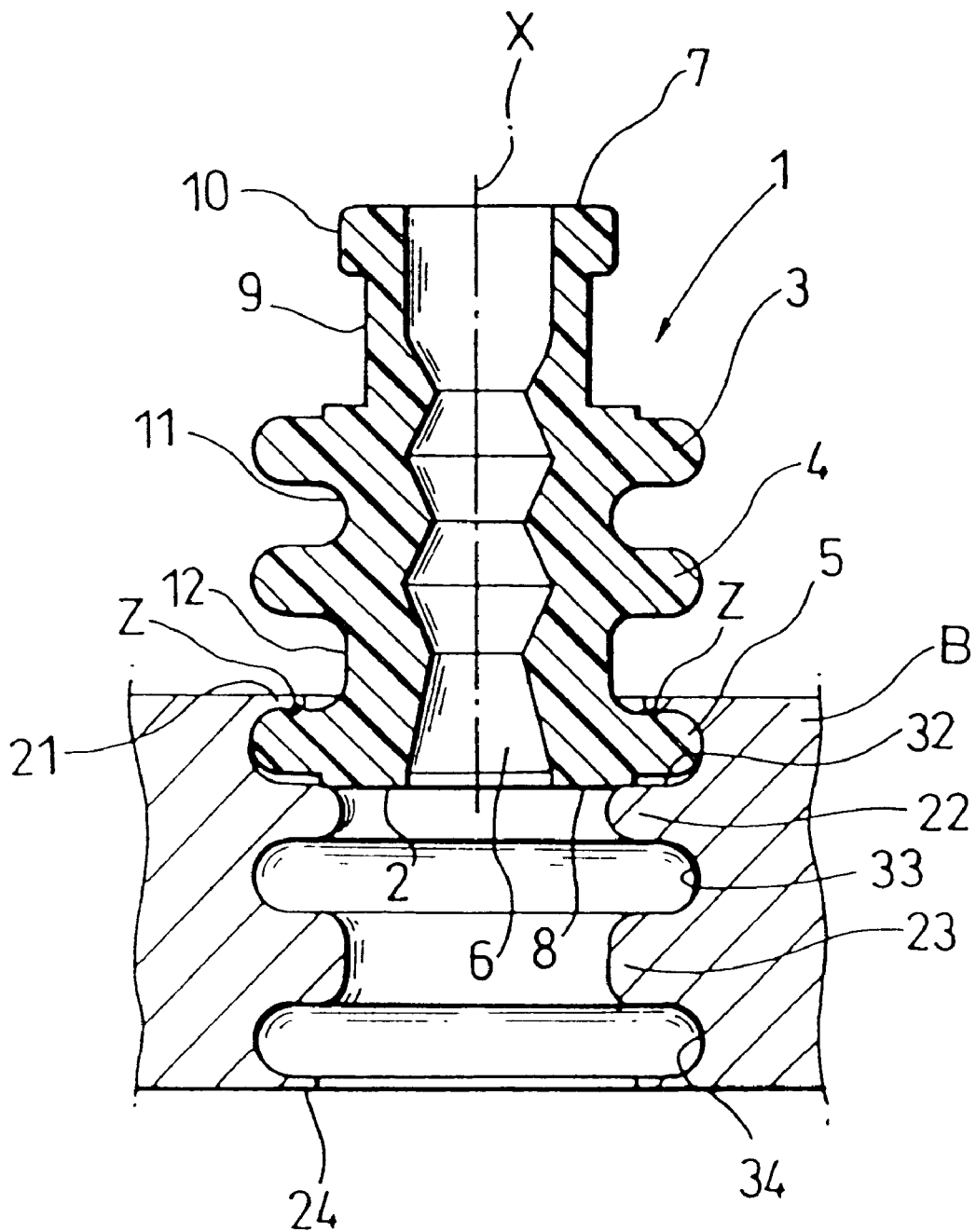
FIG. 5 is a vertical cross-sectional view similar to FIG. 4, but showing a third step of the mold removal operation.
Figure 6:
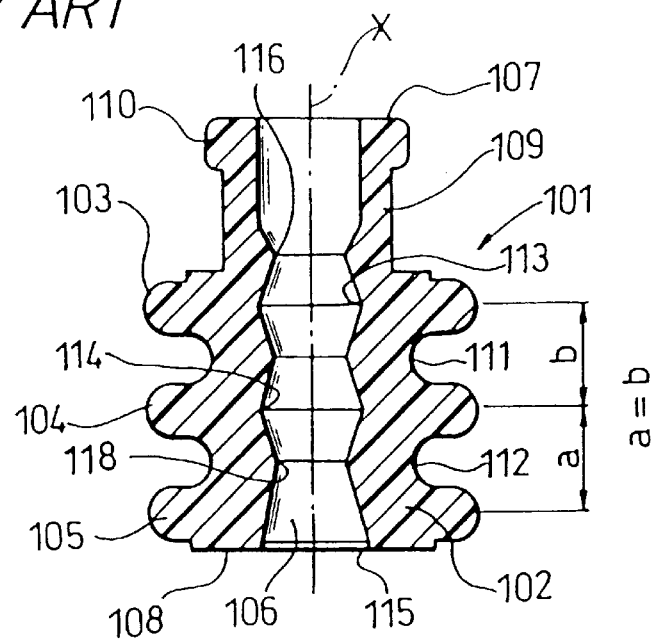
FIG. 6 is a vertical cross-sectional view of a conventional rubber plug.

FIG. 1 is a vertical cross-sectional view of a rubber product with lips provided in accordance with the present invention, and FIG. 2 shows a condition in which the molding of the rubber product of the invention with the lips is completed, but is still held in a main mold although upper and lower molds are removed, that is, a condition before the molded rubber product is completely removed from the mold. FIGS. 3 to 5 respectively show three stages or steps of removing the rubber product of FIG. 2 from the main mold by pushing out the rubber product in a direction of a void arrow.

In FIG. 1, the rubber product 1 with the lips includes a tubular body 2 having a cross-sectionally corrugated inner surface 6, and three lips 3, 4 and 5 which are formed integrally on and project radially outwardly from an outer surface of the body 2 in respective planes perpendicular to a longitudinal axis X of the body, the lips 3, 4 and 5 corresponding respectively to grooves 13, 14 and 15 of the corrugation. The inner surface 6 is formed into the corrugated cross-sectional shape defined by three ridges 16, 17 and 18 and the above grooves which are alternately arranged, and with this arrangement, advantageously, the effect of sealing a cable or a pipe member, passing through the bore of the body, is enhanced, and also the strength for elastic deformation of each lip about the groove is compensated by the ridges.

The spacing distance "c" between the adjacent lips 3 and 4 (spaced in a direction of the length of the body 2) and the spacing distance "d" between the adjacent lips 4 and 5 (spaced in the direction of the length of the body 2) are increased in a step-by-step manner from one end (upper end in FIG. 2) 7 of the body 2 toward the other end (lower end) 8 thereof. In the embodiment illustrated in FIGS. 1 to 5, the number of the lips is three, that is, there are provided the upper lip, the intermediate lip and the lower lip, and the spacing distances between the adjacent lips are increased step by step. Therefore, two kinds of spacing distances are provided, and the relation between the two spacing distances is represented by an inequality, "c<d". In a modified form of the invention, the spacing distances are decreased step by step, and in this case, also, substantially similar operation and effect are expected.

In each Figure, the one end (upper end) 7 of the product serves as a removal end projecting from the main mold B after the molding, and this end portion has a cylindrical extension portion 9 extending from the foremost lip 3 along the longitudinal axis X, and an radially outwardly-bulging projection 10 is formed on its open end. This projection 10 serves as a reinforcement portion, and also as a retaining portion when the rubber product is attached to an instrument. The extension portion 9 serves as a guide sleeve adapted to be retainingly inserted into a mounting hole in the instrument when a cable or other member is passed through the bore, and therefore the foremost lip 3 will not directly contact the instrument, so that the lip can be prevented from deformation and damage. The other end (lower end) 8 opposite to this upper end 7 is formed by the lowermost lip 5.

Figure 1A:
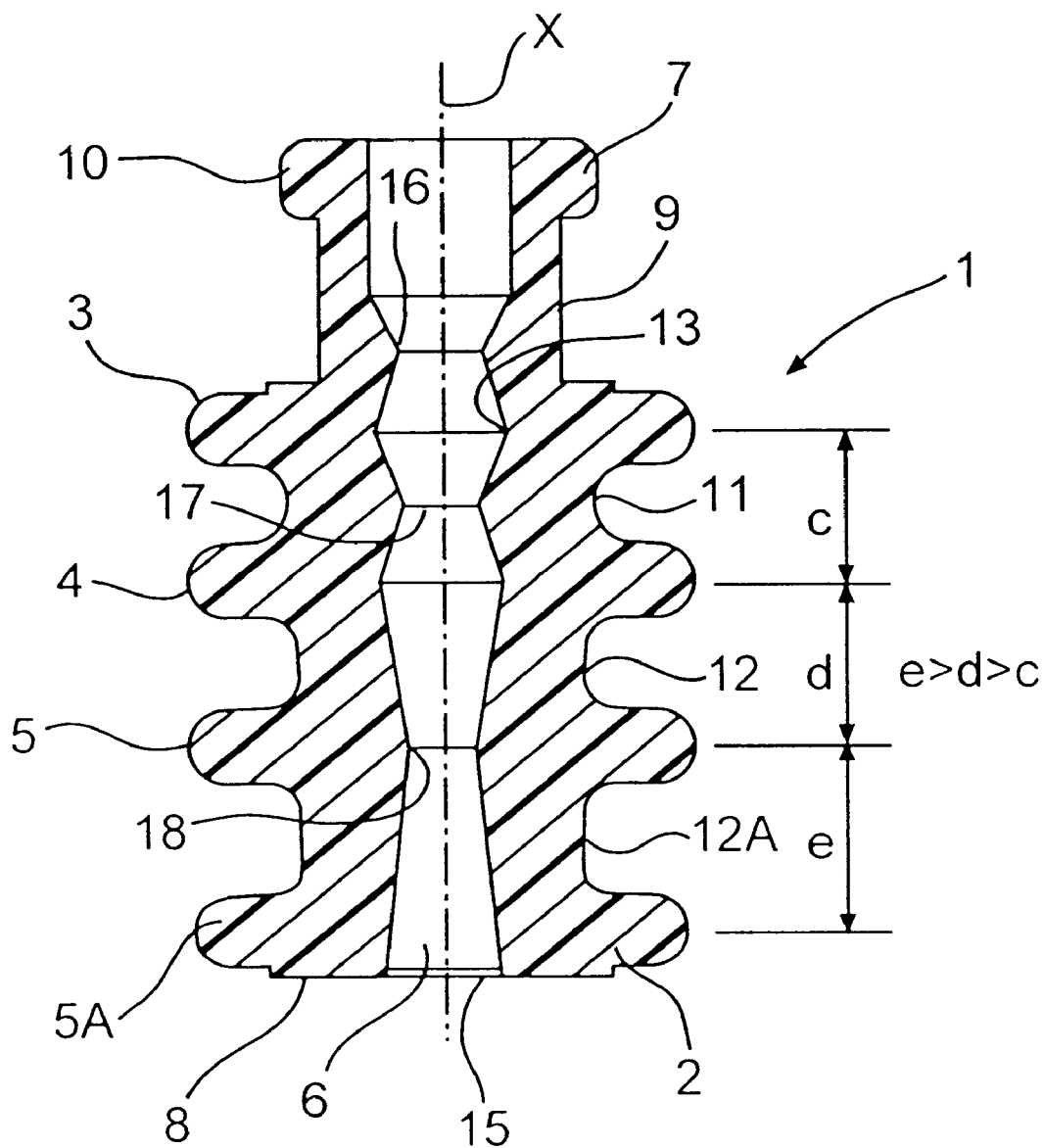
FIG. 1A illustrates another embodiment of the rubber product with lips of the present invention.

Although the body 2 of the rubber product in the illustrated embodiment has the three lips 3, 4 and 5 as in the above-mentioned conventional rubber product, the number of the lips may be more than three. (See FIG. 1A, where the reference labels correspond to FIG. 1, with an added fourth lip 5A and an additional constricted portion 12A.) However, in this case, also, the distances between the adjacent lips in the axial direction must be increased step by step from the one end 7 toward the other end 8.

Preferably, that portion of the corrugated inner surface 6, disposed at the opening of the other end 8, is defined by the groove 15 which is open, and this portion defines a space of a truncated cone-shape, so that when passing a cable or the like through the bore, it can be easily inserted into this end portion. Therefore, typically, this rubber product is suitably used as a flexible rubber bushing which is an electric part.

Next, the removal of the rubber product of the invention with the lips from the main mold B will be described in comparison with the above-mentioned conventional product.

Figure 7:
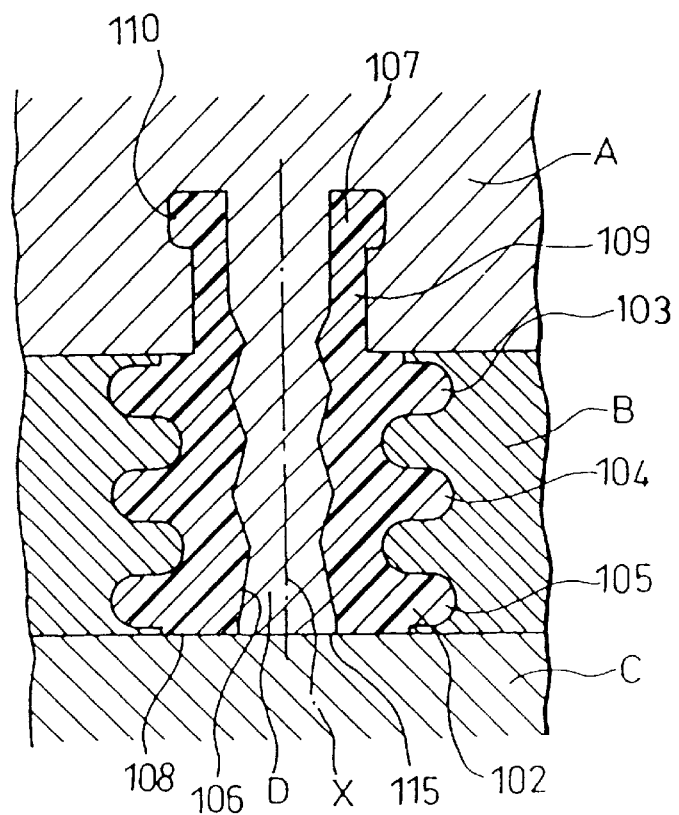
FIG. 7 is a vertical cross-sectional view showing a condition before the conventional rubber plug is removed from a main mold.

As described above, the rubber product of the invention is generally similar in construction to the conventional product shown in FIGS. 6 to 10, and therefore the mold and the molding method will be described using FIG. 7. The rubber product of the invention with the lips is produced by an injection molding method using a mold assembly comprising the upper mold A having an integral, depending rod-like core D, the lower core C having an upper flat surface, and the main mold B which is interposed between the upper and lower molds, and has a bellows-like cylindrical bore extending therethrough, this bellows-like cylindrical bore forming, together with the above core, a mold cavity.

When the molding of the rubber product 1 by this mold assembly is completed, the upper mold A with the core D is first removed, and then the lower mold C is removed, so that the main mold (intermediate mold) B remains together with the rubber product. Generally, a meticulous attention must be paid particularly when removing an elastic rubber product from a cavity having such a corrugated surface of a complicated shape, and if the rubber product is pushed out of the mold at a stretch, damage to the product, such as the separation of the lips from the body, often occurs since the relative frictional resistance is too large, and actually it is impossible to remove the product from the mold by pushing it at a stretch. Therefore, as shown in FIGS. 8 to 10 with respect to the conventional example, and also as shown in FIGS. 2 to 5 with respect to the present invention, it is an extensively-used, common practice to push out the plurality of lips in a step-by-step manner by injecting the compressed air or by a projecting member such as a pin.

Figure 8:
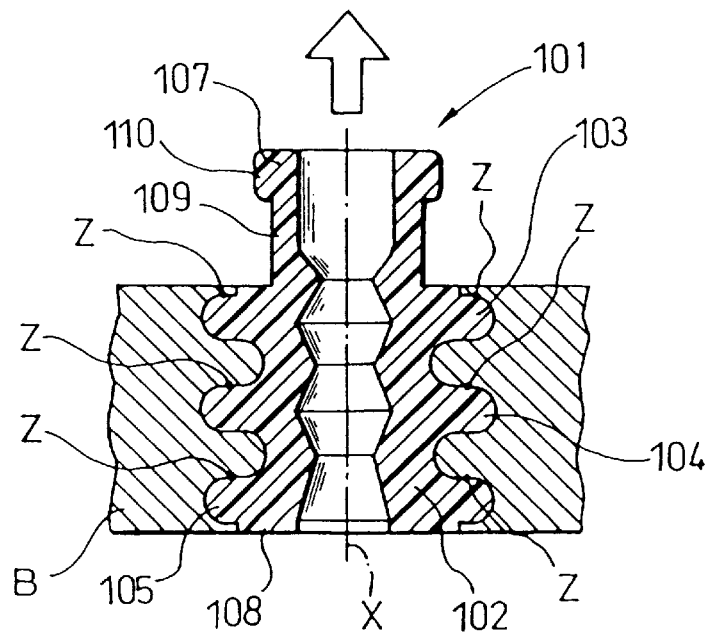
FIG. 8 is a vertical cross-sectional view showing a first step of a mold removal operation in which the conventional rubber plug is pushed out of the main mold in a direction of a void arrow.
Figure 9:
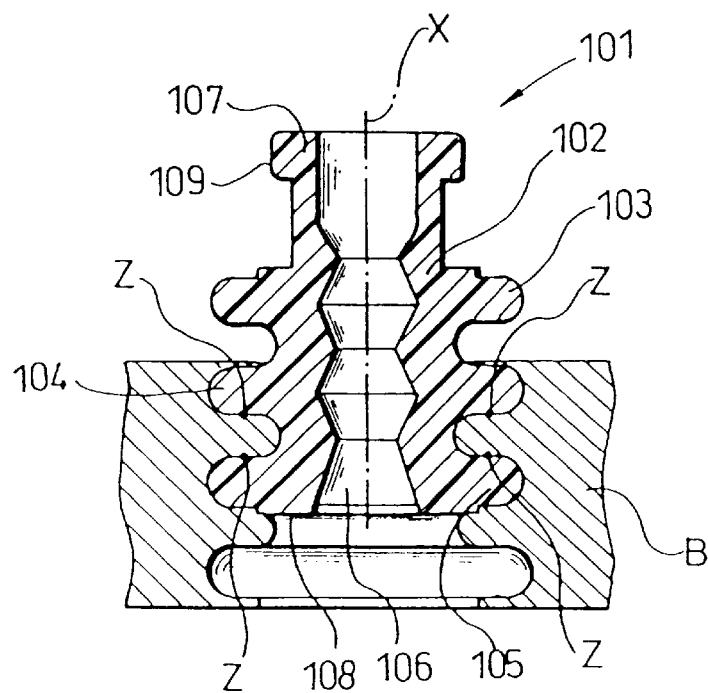
FIG. 9 is a vertical cross-sectional view similar to FIG. 8, but showing a second step of the mold removal operation.
Figure 10:
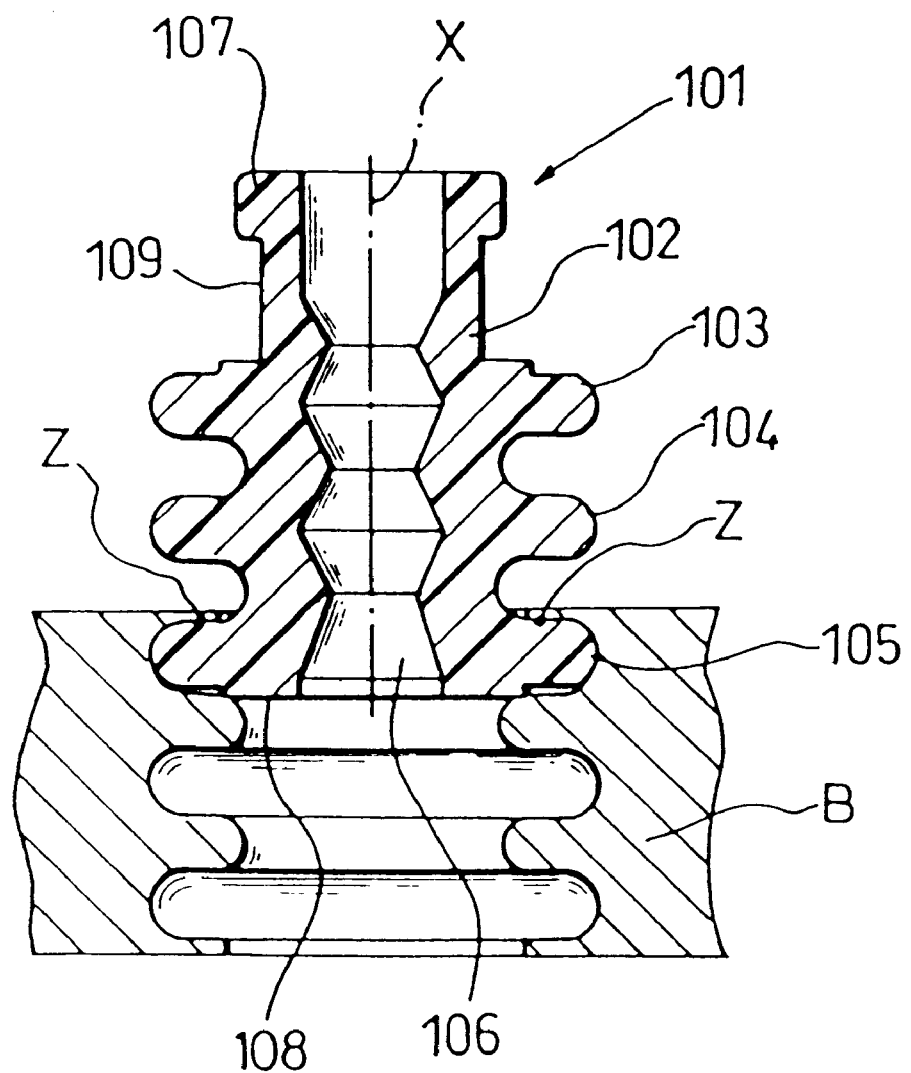
FIG. 10 is a vertical cross-sectional view similar to FIG. 9, but showing a third step of the mold removal operation.

In the conventional example shown in FIGS. 8 to 10, the number of the frictional resistance points in the direction of the diameter of the rubber product decreases in the sequence of 6.Z, 4.Z and 2.Z, and the sum of these frictional resistance points amounts to 12.Z as described above. In the present invention, although the sum and the number of the maximum frictional resistance points are the same as in the conventional example, the number of the points in a second push-out step is reduced to a half, and this second push-out step is substantially divided into two stages, and by doing so, the product can be removed from the mold with a small constant pushing force.

The process of removing the rubber product 1 of the invention with the lips from the mold will now be described with reference to FIGS. 2 to 5. In FIG. 2, the rubber product 1 is pushed out in a direction of a void arrow, and in the condition shown in FIG. 2, the frictional resistance points in the diametrical direction, which are formed between the upper surface of each of the three lips 3, 4 and 5 (extending radially outwardly in the respective planes perpendicular to the longitudinal axis X of the body 2) and a lower surface of a respective one of three annular bulge portion 21, 22 and 23 (which form the cavity in the main mold B), are indicated by two black dots Z, respectively. The three lips are spaced from one another by two constricted portions 11 and 12, and similarly the four annular bulge portions 21, 22, 23 and 24 in the main mold B are spaced from one another in the axial direction by three annular recesses 32, 33 and 34 which forms the mold cavity.

In the construction of the above mold cavity, the axial distance "c", between the two lips 3 and 4 of the rubber product 1 close to the upper end 7 is determined by the axial length of the annular bulge portion 22, and the axial distance "d" between the two lips 4 and 5 close to the lower end 8 is determined by the axial length of the annular bulge portion 23. However, the three annular recesses 32, 33 and 34, which define the axial spacing distances with respect to the annular bulge portions 21, 22, 23 and 24, have the same axial length, and therefore the molded lips have the same thickness.

Referring to the mold removal process shown in FIGS. 2 to 5, in the condition of FIG. 2 which is a first push-out removal step, the sum of the maximum frictional resistance points Z, developing at the areas of contact of the three lips 3, 4 and 5 of the rubber product 1 with the three annular bulge portions 21, 22 and 23 of the main mold B during the pushing operation, is six (6.Z), and this condition is totally the same as the condition of FIG. 8 showing the conventional example.

Next, in a step shown in FIG. 3, the upper lip 3 is already disengaged from the main mold B, and the intermediate lip 4 is fitted in the annular recess 32, so that the annular recess 34 is empty. However, the lower lip 5 is not completely fitted in the annular recess 33, and is elastically deformed and leans against the upper surface of the annular bulge portion 23. Therefore, when pushing the product 1 upwardly from this condition into a condition of FIG. 4, there exist two frictional resistance points Z (2.Z).

The reason why the lower lip 5 is thus held in the above condition is that the axial spacing distance between the two adjacent annular recesses 32 and 33 is different from the axial spacing distance "d" between the intermediate lip 4 and the lower lip 5. Incidentally, the spacing distance between the two annular recesses 32 and 33 corresponds to the spacing distance "c" between the upper and intermediate lips 3 and 4, and therefore the relation, represented by the inequality, "c<d", shown in FIG. 1, is established.

Then, in a step shown in FIG. 4, the upper surface of the lower lip 5 contacts the lower surface of the second annular bulge portion 22 of the main mold B counting from the upper end thereof, thus providing two frictional resistance points (2.Z). However, the central lip 4 is not completely fitted in the annular recess 32, and is partially elastically deformed and leans against the lower side of the uppermost annular bulge portion 21. This condition is due to the fact that the spacing distance "d" between the central and lower lips 4 and 5 is different from the spacing distance (i.e., "c") between the upper and intermediate annular recesses 32 and 33, and when shifting the rubber product into a condition shown in FIG. 5, the lower lip 5 overcomes the two frictional resistance points, and passes past the annular bulge portion 22 because of its elastic deformation.

In FIG. 5, the lower lip 5 is completely fitted in the uppermost annular recess 32, and the relation, represented by the inequality, "c<d", is no longer meaningful, and this condition is totally the same as that of the final step of FIG. 10 showing the conventional example. When completely removing the rubber product 1 in this condition from the mold, only two frictional resistance points (2.Z) are present on the area of contact between the lower surface of the uppermost annular bulge portion 12 and the upper surface of the lower lip 5, as in the conventional example.

Namely, the numbers of the frictional resistance points, developing respectively in the first to fourth steps shown respectively in FIGS. 2 to 5, are 6.Z, 2.Z, 2.Z and 2.Z, respectively, and the sum of the frictional resistance points is the same as in the conventional example. However, as described above, the number of the steps is increased by one, and the second step of the conventional example, requiring a relatively large withdrawing force, is divided into two steps generally corresponding to the third step requiring a relatively small pushing force, and the small pushing force, required for removing the rubber product from the mold, is repeatedly used during the process except for the first step.

The rubber product of the invention with the lips has the above construction, and therefore the mold removal operation can be effected successively and smoothly with the small force, and therefore damage, such as cracking, tearing and separation, to which extreme attention should be paid when removing the rubber product of such a high elastic modulus from the mold, is avoided, and therefore the mold removal operation can be initiated soon after the molding operation is completed, that is, without the need for a long curing time, and this enhances the efficiency of the operation. And besides, the construction is simple, and therefore there is another advantage that the mold can be manufactured easily and economically.

What is claimed is:

1. A rubber plug comprising:
   a tubular body having a cross-sectionally corrugated inner surface including a plurality of conically shaped surfaces; and
   a plurality of lips formed integrally on and projecting radially outward from an outer surface of the tubular body in planes perpendicular to a longitudinal axis of the tubular body and including first, second and third lips having substantially the same size and shape, the plurality of lips being spaced along the longitudinal axis,
   wherein a first lip is adjacent to the second lip, and the second lip is adjacent to the third lip, and
   wherein a first distance between the first and second lip in a direction of the longitudinal axis is different than a second distance between the second and third lips in the direction of the longitudinal axis.

2. The rubber plug according to claim 1, in which the plurality of lips are formed integrally on the outer surface of the tubular body to correspond to grooves in the corrugated inner surface of the tubular body.

3. The rubber plug according to claim 1 or claim 2, wherein one end of the tubular body has a cylindrical extension portion extending from a foremost lip in the direction of the longitudinal axis, and another end is formed by a rearmost lip.

4. The rubber plug according to claims 1 or 2, wherein the tubular body has more than three lips.

5. The rubber plug according to claim 4, wherein a portion of the corrugated inner surface that is disposed at an opening of the other end is defined by an open groove.

6. The rubber plug according to claim 2, wherein the plurality of grooves are formed at same intervals as corresponding lips on the outer surface of the tubular body.

7. The rubber plug according to claim 1, further including a plurality of grooves formed on an inner surface of the tubular body at same intervals as corresponding lips on the outer surface of the tubular body.

8. The rubber plug according to claim 1, wherein the rubber plug also includes a fourth lip adjacent to the third lip and having the same size and shape as the third lip, and
   wherein a third distances between the third and fourth lips in the direction of the longitudinal axis is different from both the first and second distances.

9. The rubber plug according to claim 8, wherein each lip has at least one edge oriented substantially perpendicular to the longitudinal axis.

10. The rubber plug according to claim 1, wherein each lip has at least one edge oriented substantially perpendicular to the longitudinal axis.

* * * * *

UNITED STATES PATENT AND TRADEMARK OFFICE
CERTIFICATE OF CORRECTION

PATENT NO. : 6,036,541
DATED : March 14, 2000
INVENTOR(S) : Seiji Koumatsu

It is certified that error appears in the above-identified patent and that said Letters Patent is hereby corrected as shown below:

<u>Column 8, claim 8,</u>
Line 28, delete "distances" and insert -- distance --.

Signed and Sealed this

Second Day of April, 2002

*Attest:*

JAMES E. ROGAN
*Attesting Officer*     *Director of the United States Patent and Trademark Office*